Patented Aug. 17, 1948

2,447,029

UNITED STATES PATENT OFFICE 2,447,029

PROCESS OF PREPARING CATALYSTS FOR BENZINE SYNTHESIS

Otto Roelen and Walter Feisst, Oberhausen-Holten, Germany, vested in the Attorney General of the United States No Drawing. Original application March 23, 1937, Serial No. 132,595. Divided and this application November 1, 1941, Serial No. 417,496. In Germany April 1, 1936

3 Claims. (Cl. 252—238)

This invention relates to processes for reacting carbon monoxide and hydrogen, and more particularly to benzine synthesis in the presence of catalysts deposited on carrier substances.

This is a division of Serial No. 132,595, filed March 23, 1937, which matured into Patent No. 2,261,184.

It is an object of this invention to provide improved catalytic materials, and to utilize such improved catalytic materials in processes for reacting carbon monoxide and hydrogen.

It is another object of this invention to provide processes for regenerating these catalysts after they have suffered a material reduction in activity.

Other objects, and the manner in which the same are attained, will appear from the following description.

In large scale benzine synthesis from carbon monoxide and hydrogen the catalysts employed are metals of the iron group (iron, cobalt, nickel) whose active constituents have been precipitated on to kieselguhr. Certain difficulties have been experienced in the production of such catalysts, as the kieselguhr used as carrier mass when brought into contact with acidic and alkaline reagents gives off soluble constituents which have an extremely prejudicial action on the catalytic substance.

Thus for example when kieselguhr is added to the alkaline precipitating solution for the metal catalysts, a part of the silicic acid of the kieselguhr dissolves in the form of alkali silicate, and reacts with the heavy-metal salts to form insoluble heavy metal silicates which cannot be reduced to metal and thus prejudicially affect the activity of the catalyst.

We have now found that the aforenoted drawbacks are eliminated by the use of carbon dioxide compounds of magnesium as carrier substances, insoluble in alkaline solutions, for precipitating catalysts for the Fischer-Tropsch benzine synthesis, and more particularly for the production of catalysts containing magnesium, it having been found that basic magnesium carbonate is particularly suitable.

The preparation of such catalysts is effected in a known manner by precipitating the catalytically active metals from corresponding metal salt solutions. The carrier mass, which consists of one of the magnesium compounds referred to above, is added immediately after the precipitation of the metal catalysts and is stirred with the precipitate.

The catalysts produced on magnesium carbonate behave during synthesis just like the catalysts precipitated on kieselguhr. Under like reaction conditions they give normal yields on the conversion of mixtures of carbon monoxide and hydrogen into liquid hydrocarbons at the same low reaction temperature of from 180–185° C. This similarity extends to regeneration, the catalysts precipitated on magnesium carbonate being regenerated by treatment with hydrogen in the synthesis chamber itself in the same manner as is known in connection with kieselguhr carriers.

The catalysts according to the present invention are in no way inferior as regards their length of life to those hitherto used which are precipitated on kieselguhr inasmuch as the catalysts according to the invention have proved to be equally valuable for purposes of benzine synthesis. The advantage of using magnesium carbonates as carrier substances consists in the facility of procuring the raw materials. The carrier substances according to the invention do not require the procurement of comparatively rare natural substances as magnesium is found in huge quantities all over the earth. Unlike kieselguhr, magnesium carbonate of exactly the same purity and properties can easily be produced everywhere. Another advantage consists in that the great difficulties which are caused by the impurities in kieselguhr such as iron, aluminum, organic substances and the like, are eliminated. As raw materials there may be used the natural magnesium carbonates which are available in inexhaustible quantities or magnesium salts such as magnesium chloride which are available in salt deposits.

Furthermore, it is of great advantage to work up spent catalysts produced from magnesium carbonate. The paraffin deposited on the catalysts is first removed conventionally by extraction with solvents, whereafter the catalyst is broken up, cold water is poured over it and it is then treated with carbon dioxide. This causes all the magnesium to readily dissolve as a bicarbonate, and by simple filtration in the cold state the liquid is quantitatively divided up into a solution of magnesium bicarbonate on the one hand and a residue containing the metal catalysts on the other. The solution of magnesium bicarbonate is again freed of part of the carbon dioxide either by being boiled or by blowing steam into it. This causes the magnesium to precipitate out completely as basic carbonate.

The residue containing the metal catalysts is dissolved in nitric acid in the usual manner, and the metal catalysts are again precipitated with alkaline precipitating agents. Since, when using cobalt catalysts containing magnesium and thorium, a certain quantity of magnesium is added directly to the metal salt solutions for activating purposes, the dissolving of the magnesium carbonate by means of carbon dioxide does not need to be carried out quantitatively up to the extreme limit. The magnesium carbonate remaining in the residue is then dissolved with the other metals by means of acid, and the dissolved magnesium is precipitated at the same time these metals are precipitated.

The use of the carrier substances according to the invention is particularly advantageous by virtue of the fact that to dissolve them no other chemicals are required except the cheap carbon dioxide which is available in large quantities as waste gas, and which moreover may be used in circulation. Unlike kieselguhr, magnesium can be used as often as desired so that there is practically no loss in carrier mass. Furthermore, no foreign substances find their way into the catalyst or into the solution from which the catalyst is precipitated.

We claim:

1. In the regeneration for reuse of catalytic masses spent in the synthesis of benzine from carbon monoxide and hydrogen and comprising iron group catalysts precipitated on a carrier substance, the improvement which comprises using magnesium carbonates as the carrier substance, the improvement which comlyst with water and carbon dioxide to dissolve out the magnesium carbonates, separating the solution of magnesium carbonates from the residue, treating this solution for the removal of part of the carbon dioxide by heating it to the boiling point, whereby the magnesium is precipitated in the form of basic carbonate, and combining the precipitated carbonate with freshly precipitated iron group catalysts.

2. In the regeneration for reuse of catalytic masses spent in the synthesis of benzine from carbon monoxide and hydrogen and comprising iron group catalysts precipitated on a carrier substance, the improvement which comprises using magnesium carbonates as the carrier substance, treating the spent carrier catalyst with water and carbon dioxide to dissolve out the magnesium carbonates, separating the solution of magnesium carbonates from the residue, treating this solution for the removal of part of the carbon dioxide by the blowing in of steam, whereby the magnesium is precipitated in the form of basic carbonate, and combining the precipitated carbonate with freshly precipitated iron group catalysts.

3. In the regeneration of catalytic masses spent in the synthesis of benzine from carbon monoxide and hydrogen and comprising iron group catalysts precipitated on a carrier substance, the improvement which comprises using magnesium carbonates as the carrier substance, treating spent carrier catalyst with water and carbon dioxide to dissolve out the magnesium carbonates, separating the solution of magnesium carbonates from the residue, precipitating basic carbonate by freeing the solution of part of the carbon dioxide, and combining the precipitated carbonate with freshly precipitated iron group catalysts.

OTTO ROELEN.
WALTER FEISST.

REFERENCES CITED

The following references are of record in the file of this patent:

UNITED STATES PATENTS

| Number | Name | Date |
|---|---|---|
| 1,034,330 | Young | July 30, 1912 |
| 1,741,306 | Jaeger | Dec. 31, 1929 |
| 1,772,652 | White | Aug. 12, 1930 |
| 1,845,439 | Pier | Feb. 16, 1932 |
| 1,913,774 | Seib | June 13, 1933 |
| 1,948,407 | Watts | Feb. 20, 1934 |
| 2,159,140 | Eckell | May 23, 1939 |

FOREIGN PATENTS

| Number | Country | Date |
|---|---|---|
| 565 | Austria | Nov. 25, 1899 |
| 41,488 | Sweden | Feb. 26, 1914 |

OTHER REFERENCES

Fischer et al., "Nat'l Pet. News," Oct. 13, 1926, pages 95 and 96. (Copy in Pat. Off. Libr.)

Roscoe et al., "A Treatise on Chemistry," vol. 2, 1923, pages 657–659.

Certificate of Correction

Patent No. 2,447,029.

August 17, 1948.

OTTO ROELEN ET AL.

It is hereby certified that error appears in the printed specification of the above numbered patent requiring correction as follows: Column 3, line 32, after the syllable and hyphen "com-" insert *prises using magnesium carbonates as the carrier substance, treating the spent carrier cata-*; and that the said Letters Patent should be read with this correction therein that the same may conform to the record of the case in the Patent Office.

Signed and sealed this 2nd day of November, A. D. 1948.

[SEAL]

THOMAS F. MURPHY,
*Assistant Commissioner of Patents.*